(No Model.)

J. MURPHY.
RUBBER BELTING.

No. 355,834. Patented Jan. 11, 1887.

WITNESSES:-
M. E. Roberts.
S. H. Morgan.

INVENTOR:-
John Murphy
by Wm H. Weightman
Atty

UNITED STATES PATENT OFFICE.

JOHN MURPHY, OF BROOKLYN, NEW YORK.

RUBBER BELTING.

SPECIFICATION forming part of Letters Patent No. 355,834, dated January 11, 1887.

Application filed October 25, 1886. Serial No. 217,132. (No model.)

*To all whom it may concern:*

Be it known that I, JOHN MURPHY, a citizen of the United States, residing in the city of Brooklyn, county of Kings, State of New York, have invented certain new and useful Improvements in Covering for Belting, of which the following is a specification, reference being had to the accompanying drawings.

My improvements relate to the method of covering rubber belting in the course of its manufacture, and refer specially to what is known as "seamless covering."

The object of such invention is to provide a better protection and greater capacity for wear at the edges of the belting.

In the present method of seamless covering there is a great tendency of the covering to loop away or become loosened from the edges of the inner fabric of the belting, arising from the compression brought to bear upon the belting while being cured or vulcanized. The present method for overcoming this difficulty is to press the belting within a mold of the exact width of belting to be produced, so as to assure a close contact of the covering with the edges of the belting while the vulcanizing process is going on, and thus prevent the looping or breaking away at the edges.

My improvements consist in providing a special binding-strip of thin rubber-coated fabric or material, with which I cover and inclose the edges of the inner portions or layers of the belt, lapping the said binding-strip well beyond the edges of the layers, to secure a safe adhesion. With such binding in place a good coating of clear rubber is put on, covering the whole belt on both face and edges.

There are several methods for applying this covering. The preferable one is to prepare the edge-binding by applying a heavy coat of rubber on one side and a friction-coating on the other. The edge-binding is then applied to the edges of the belting, overlapping them well to make a safe and close contact. A sheet of clear rubber is then applied to each face of the belt, overlapping the edge-binding well. The whole is then pressed to an even thickness and vulcanized. Another method is to coat the edge-binding with a friction-coating of rubber on each side, and applying the same to the sheet-rubber for outer coating, in such manner that when this sheet is applied the edge-binding strips shall cover the edges of the inner portion of belt about which it is wrapped.

Figure 1:
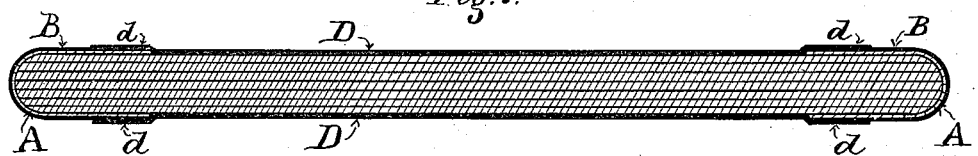
Figure 2:
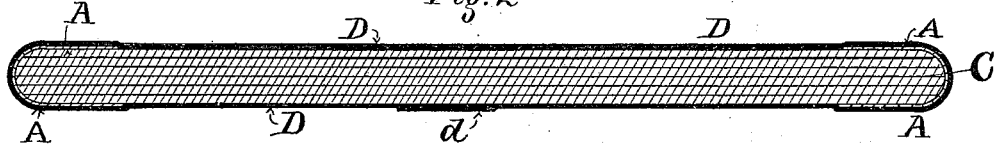
Figure 3:
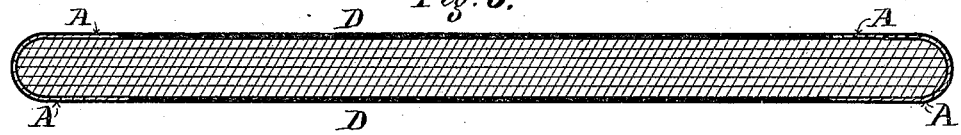

In the drawings, Figures 1 and 2 represent sections of belting embodying my improvements. These sections are enlarged to more clearly show the different details of construction and modes of application of the same. Fig. 3 represents a section of finished belting embodying my improvements.

Similar letters of reference designate like parts in all of the figures.

In Fig. 1 the edge-binding strip shown at A is represented as extending over the edges of inner belt-section, C, and a short distance over the flat faces. This edge-binding strip A is covered on the outer face with the thicker layer of rubber, B, intended to form a portion of the final outer covering. The portion D, covering the flat faces of the belting, is shown overlapping the edge-binding strips at *d*.

In Fig. 2 a sheet of clear rubber is cut to a width sufficient to wrap about the whole belt and overlap, as shown at *d*. The edge-binding strips A, having a friction-coating of rubber on both sides, are attached to this prepared wrapping-sheet and the whole applied, the strips covering the edges, as shown at A in Fig. 2, and the sheet covering the whole, as shown at D, and jointed, as shown at *d*.

In either case the belting is pressed or rolled to a close adhesion and flat surface and the whole vulcanized, resulting in a section as appears in Fig. 3.

What I claim as new, and desire to secure by Letters Patent, is—

1. The improvement in the manufacture of rubber belting which consists in applying to the edges of the inner fabric of the belting a binding-strip of thin rubber-coated material, covering the whole with a coating of clear rubber, and rolling, pressing, and vulcanizing the same, substantially as set forth.

2. In combination with the inner layers of a belt, an edge-binding of thin rubber-coated fabric or material and an outer protective covering of clear rubber, substantially as shown and described.

3. In combination with the several portions of a rubber belt, a binding-strip of thin rubber-coated fabric or material attached immediately to the edges of the inner fabric of the belt, substantially as and for the purposes specified.

JOHN MURPHY.

Witnesses:
TERENCE J. MORRIS,
WM. H. WEIGHTMAN.